(12) United States Patent
Izawa et al.

(10) Patent No.: US 8,507,139 B2
(45) Date of Patent: Aug. 13, 2013

(54) FUEL CELL MODULE

(75) Inventors: Yasuhiro Izawa, Mishima (JP); Satoshi Shiokawa, Fuji (JP); Takashi Ono, Kirishima (JP); Mitsuhiro Nakamura, Kirishima (JP)

(73) Assignees: Toyota Jidosha Kabushiki Kaisha, Toyota (JP); Kyocera Corporation, Kyoto-Shi (JP)

( * ) Notice: Subject to any disclaimer, the term of this patent is extended or adjusted under 35 U.S.C. 154(b) by 0 days.

(21) Appl. No.: 13/513,432

(22) PCT Filed: Dec. 21, 2010

(86) PCT No.: PCT/IB2010/003472
§ 371 (c)(1),
(2), (4) Date: Jun. 1, 2012

(87) PCT Pub. No.: WO2011/077256
PCT Pub. Date: Jun. 30, 2011

(65) Prior Publication Data
US 2012/0251905 A1    Oct. 4, 2012

(30) Foreign Application Priority Data
Dec. 21, 2009   (JP) ................................. 2009-289791

(51) Int. Cl.
*H01M 8/02* (2006.01)
*H01M 8/04* (2006.01)
*H01M 8/24* (2006.01)

(52) U.S. Cl.
USPC ........................................ 429/415; 429/433

(58) Field of Classification Search
USPC ................. 429/452–471, 512–516, 403–427, 429/535, 72, 120, 434–442
See application file for complete search history.

(56) References Cited

U.S. PATENT DOCUMENTS 6,492,050 B1   12/2002  Sammes
2005/0123808 A1   6/2005  Draper et al.
(Continued)

FOREIGN PATENT DOCUMENTS
EP   1 786 055 A1   5/2007
(Continued)

OTHER PUBLICATIONS

International Search Report issued in International Patent Application No. PCT/IB2010/003472 dated May 24, 2011, pp. 1-3.
Written Opinion issued in International Patent Application No. PCT/IB2010/003472 dated May 24, 2011, pp. 1-8.

*Primary Examiner* — Basia Ridley
*Assistant Examiner* — Caitlin Wilmot
(74) *Attorney, Agent, or Firm* — Oliff & Berridge, PLC

(57) ABSTRACT

A fuel cell module includes in a casing: a fuel cell stack that is formed by stacking a plurality of unit cell; an oxidant gas distributing member that is disposed at a side surface, that extends in a stack direction of the unit cells, of the fuel cell stack that extends in a direction from one end to another end of each of the unit cells, and that supplies the oxidant gas to the another end of each unit cell after supplying the oxidant gas through the oxidant gas distributing member from the one end to the another end; a reformer disposed at the one end; and a combustion portion that is disposed between the one end and the reformer. The oxidant gas distributing member has a higher thermal conductivity at the one end side of the unit cells than at the another end side of the unit cells.

4 Claims, 16 Drawing Sheets

(56) References Cited

U.S. PATENT DOCUMENTS

| | | |
|---|---|---|
| 2006/0010866 A1 | 1/2006 | Rehg et al. |
| 2006/0246333 A1 | 11/2006 | Schaevitz et al. |
| 2006/0257704 A1 | 11/2006 | Ogino et al. |
| 2009/0239121 A1 | 9/2009 | Ono |
| 2010/0119906 A1 | 5/2010 | Ono |

FOREIGN PATENT DOCUMENTS

| | | |
|---|---|---|
| JP | A-2006-331881 | 12/2006 |
| JP | A-2007-59377 | 3/2007 |
| JP | A-2007-157479 | 6/2007 |
| JP | A-2008-034205 | 2/2008 |
| JP | A-2008-108722 | 5/2008 |
| JP | A-2009-158122 | 7/2009 |
| WO | WO 2009/016857 A1 | 2/2009 |

FUEL CELL MODULE

BACKGROUND OF THE INVENTION

1. Field of the Invention

The invention relates to a fuel cell module.

2. Description of the Related Art

The fuel cell generates electric energy, generally, by using hydrogen and oxygen as fuels. The fuel cell is environment-friendly and is able to achieve high energy efficiency, so that fuel cells are being widely researched and developed as a future energy supply source.

Generally, a fuel cell has a fuel cell stack that is constructed by stacking a plurality of unit cells, and therefore generates large electric power. Japanese Patent Application Publication No. 2007-59377 (JP-A-2007-59377) describes a reformer-integrated type fuel cell in which a reformer is disposed on an upper portion of a fuel cell stack. In this technology, oxidant gas flows in a reactant gas distributing member, and is thereby supplied to a lower end of each unit cell.

In a fuel cell module having a construction in which the fuel off-gas that is left unused for electricity generation is burned at one end of the unit cells as in the technology according to Japanese Patent Application Publication No. 2007-59377 (JP-A-2007-59377), sometimes there occurs temperature difference within the fuel cell module, that is, sometimes the temperature is relatively high at the one end of unit cells, and relatively low at another end of the unit cells. Furthermore, in a fuel cell module having a construction in which the oxidant gas for use for the electricity generation of the unit cells is supplied to the another end of the unit cells, there is risk of decline in the temperature at the another end of the unit cells and increase in the temperature difference within the unit cells in the vertical direction.

SUMMARY OF THE INVENTION

The invention provides a fuel cell module capable of reducing the temperature difference within a unit cell.

A first aspect of the present invention is related to a fuel cell module that includes in a casing: a fuel cell stack that is formed by stacking a plurality of unit cells that generate electricity using an oxidant gas and a fuel gas, an oxidant gas distributing member that is disposed at a side surface, that extends in a stack direction of the unit cells, of the fuel cell stack that extends in a direction from one end to another end of each of the unit cells, and that supplies the oxidant gas for use for electricity generation of the unit cells to the another end of each unit cell after supplying the oxidant gas through the oxidant gas distributing member in the direction of the unit cells from the one end to the another end; a reformer disposed at the one end; and a combustion portion that is disposed between the one end and the reformer, and that burns a fuel off-gas that is left unused in the electricity generation of the unit cells using an oxidant off-gas that is left unused in the electricity generation of the unit cells. The oxidant gas distributing member has a higher thermal conductivity at the one end side of the unit cells than at the another end of the unit cells.

According to the above aspect, it is possible to accelerate the heat exchange between each of the one end of the unit cells and the oxidant gas that flows in the oxidant gas distributing member. Due to this effect, the oxidant gas that flows in the oxidant gas distributing member can be efficiently heated by the heat at the each of the one end of the unit cells. This makes it possible to increase the temperature of the unit cells at the other end by the heated oxidant gas supplied to the other end of the unit cells. Besides, since the oxidant gas distributing member at the one end of the unit cells has a higher thermal conductivity than the another end of the unit cells, that is, since the thermal conductivity at the another end of the unit cells is lower in than the thermal conductivity at the one end of the unit cells, it is possible at the another end of the unit cells to restrain the heat exchange between the unit cells and the oxidant gas that flows in the oxidant gas distributing member.

In the above aspect, the oxidant gas distributing member may have, at the one end side of the unit cells, at least one of: a fin; a partition member that partitions a channel of the oxidant gas distributing member into a plurality of paths; and a dimple.

A second aspect of the present invention is related to a fuel cell module that includes in a casing: a fuel cell stack that is formed by stacking a plurality of unit cells that generate electricity using an oxidant gas and a fuel gas; an oxidant gas distributing member that is disposed at a side surface, that extends in a stack direction of the unit cells, of the fuel cell stack that extends in a direction from one end to another end of each of the unit cells, and that supplies the oxidant gas for use for electricity generation of the unit cells to the another end of each unit cell after supplying the oxidant gas through the oxidant gas distributing member in the direction of the unit cells from the one end to the another end; a reformer disposed at the one end; a combustion portion that is disposed between the one end and the reformer, and that burns a fuel off-gas that is left unused in the electricity generation of the unit cells using an oxidant off-gas that is left unused in the electricity generation of the unit cells; and internal thermal insulation members that are disposed at two side surfaces of the fuel cell stack which extend in a stack direction of the unit cells. At least one of the internal thermal insulation members has a higher thermal conductivity at the one end side of the unit cells than at the another end of the unit cells.

According to the above aspect, it is possible to accelerate the heat exchange between each of the one end of the unit cells and the oxidant gas that flows in the oxidant gas distributing member. Due to this effect, the oxidant gas that flows in the oxidant gas distributing member can be efficiently heated by the heat at the each of the one end of the unit cells. This makes it possible to increase the temperature of the unit cells at the other end by the heated oxidant gas supplied to the other end of the unit cells. Besides, since the internal thermal insulation members of the oxidant gas distributing member side has a higher thermal conductivity at the one end of the unit cells than at the another end of the unit cells, that is, since the thermal conductivity at the another end of the unit cells is lower in than the thermal conductivity at the one end of the unit cells, it is possible at the another end of the unit cells to restrain the heat exchange between the unit cells and the oxidant gas that flows in the oxidant gas distributing member. Since the efficiently heated oxidant gas is supplied to the another end of the unit cells and the temperature decline in the another end of the unit cells is restrained, it possible to reduce the temperature difference within the unit cells in the direction from the one end to the another end.

In the above aspect, the internal thermal insulation members may be constructed so that the thermal conductivity increases gradually from the another end side of the unit cells to the one end side of the unit cells.

In the above aspect, the internal thermal insulation members may be constructed so that thermal conductivity increases stepwise from the another end side of the unit cells to the one end side of the unit cells.

In the above aspect, the oxidant gas distributing member may supply the oxidant gas in the order of the reformer, the combustion portion, and to the another end after supplying the oxidant gas from the one end to the another end. The oxidant gas distributing member may include a protruded portion that is protruded toward the side surface of the fuel cell stack.

According to the above aspect, since the protruded portion that is protruded toward the side surface of the fuel cell stack is provided on the oxidant gas distributing member, it is possible to accelerate the heat exchange at the protruding portion between the fuel cell stack and the oxidant gas that flows in the oxidant gas distributing member. Due to this effect, oxidant gas that flows in the oxidant gas distributing member can be heated by the heat of the fuel cell stack. Since the temperature of the oxidant gas that flows in the oxidant gas distributing member increases, it possible to reduce the temperature difference of the fuel cell stack within the unit cells in the direction from the one end to the another end.

In the above aspect, the protruded portion may include a rectifying member that brings the oxidant gas in the oxidant gas distributing member closer to the fuel cell stack than when there is no rectifying member formed.

In the above aspect, the another end side of the protruded portion may extend beyond the another end of the unit cellstowards the reformer side.

According to the above aspects, it possible to provide the fuel cell module that reduce the temperature difference within the unit cells.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

The embodiments of the invention will be described below.

Figure 1:
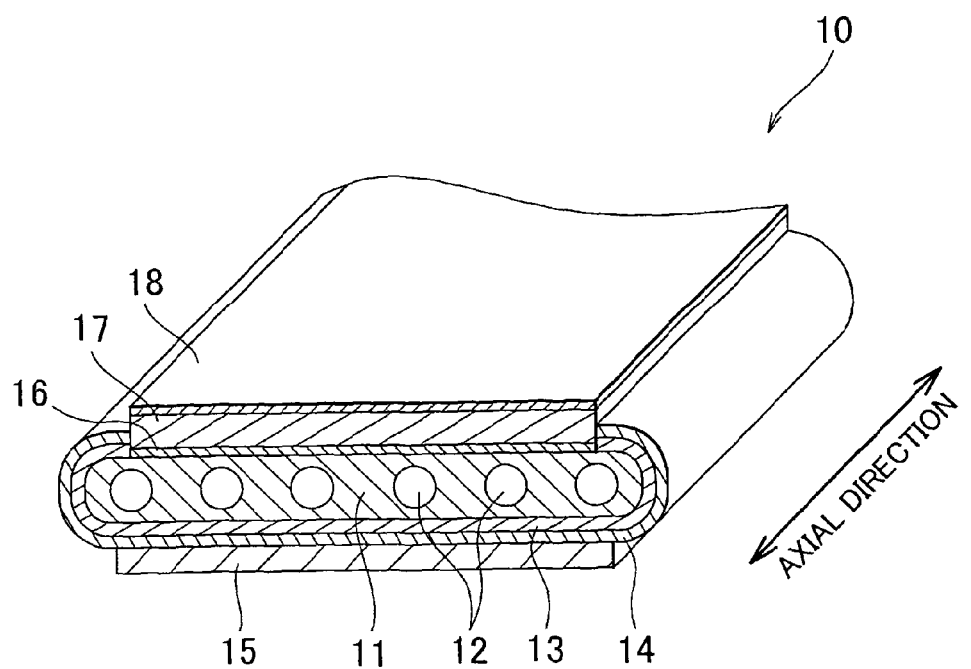
FIG. 1 is a partial perspective view of a unit cell which includes a cross-section of the unit cell.

Firstly, a fuel cell module in accordance with a first embodiment of the invention will be described. FIG. 1 is a partial perspective view of a unit cell 10 which includes a cross-sectional view of the unit cell 10. As shown in FIG. 1, the unit cell 10 has a flattened column shape as a whole. Within an electroconductive support 11 having gas permeability, there are formed a plurality of fuel gas passageways 12 extending through the unit cell 10 in the direction of an axis thereof. A fuel electrode 13, a solid electrolyte 14 and an oxygen electrode 15 are stacked in that order on one of two side surfaces of an outer periphery of the electroconductive support 11. On the other side surface that opposes the oxygen electrode 15, there is provided an interconnector 17 underneath which a joining layer 16 lies. A p-type semiconductor layer 18 is provided on top of the interconnector 17.

A fuel gas containing hydrogen is supplied to the fuel gas passageways 12, so that hydrogen is supplied to the fuel electrode 13. On the other hand, an oxidant gas containing oxygen is supplied to the surroundings of the unit cell 10. Electricity is generated by the following electrode reactions occurring at the oxygen electrode 15 and the fuel electrode 13. The electricity generating reaction takes place at a temperature, for example, 600° C. to 1000° C.

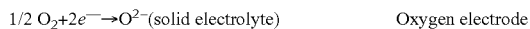

$1/2\ O_2 + 2e^- \rightarrow O^{2-}$(solid electrolyte)　　　　Oxygen electrode

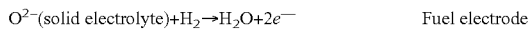

$O^{2-}$(solid electrolyte)$+ H_2 \rightarrow H_2O + 2e^-$　　　　Fuel electrode

A material of the oxygen electrode 15 has oxidation resistance, and is porous so that gaseous oxygen will reach an interface between the oxygen electrode 15 and the solid electrolyte 14. The solid electrolyte 14 has a function of migrating oxygen ion $O^{2-}$ from the oxygen electrode 15 to the fuel electrode 13. The solid electrolyte 14 is composed of an oxygen ion-conductive oxide. Besides, the solid electrolyte 14 is stable in an oxidative atmosphere and also in a reductive atmosphere, and is composed of a compact material, in order to physically separate the fuel gas and the oxidant gas. The fuel electrode 13 is formed from a porous material that is stable in the reductive atmosphere and has affinity to hydrogen. The interconnector 17 is provided in order to electrically connect the unit cells 10 to each other in series, and is composed of a compact material so as to physically separate the fuel gas and the oxygen-containing gas.

For example, the oxygen electrode 15 is formed from a lanthanum cobaltite-base perovskite-type composite oxide, and the like, that is highly conductive for both electrons and positive ions. The solid electrolyte 14 is formed from, for example, a zirconia ($ZrO_2$) containing $Y_2O_3$ (YSZ) which is high in ion conductivity, and the like. The fuel electrode 13 is formed from, for example, a mixture of $Y_2O_3$-containing $ZrO_2$ (YSZ) and Ni, which is high in electron conductivity. The interconnector 17 is formed from, for example, a solid solution of $LaCrO_3$ with an alkaline earth oxide. As for these materials, materials that are similar to each other in thermal expansion coefficient are used.

Figure 2A:
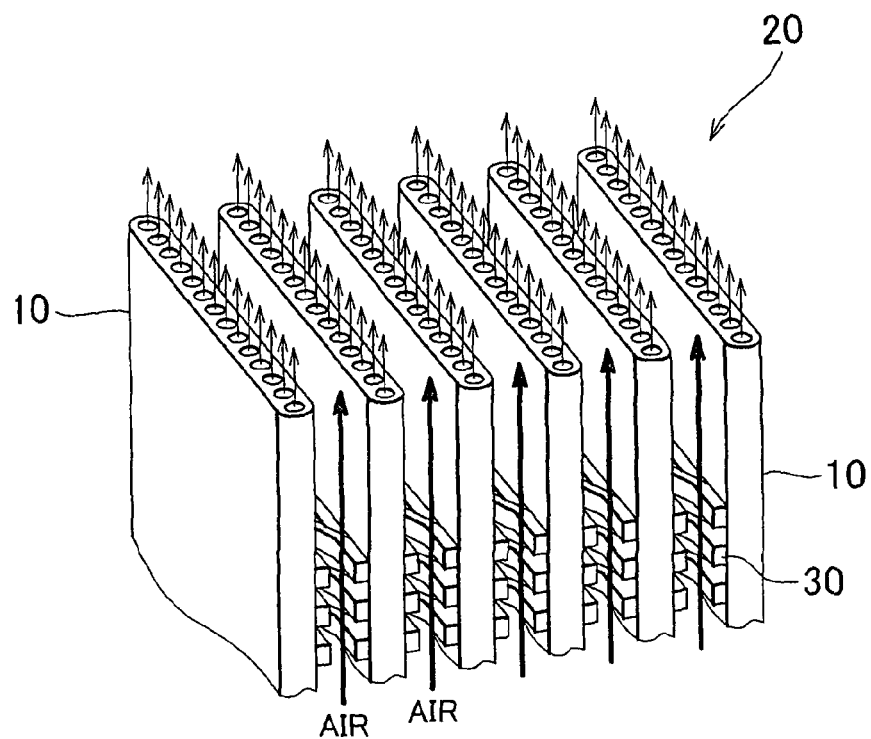
FIG. 2A is a perspective view in which a portion of a fuel cell stack is shown in order to illustrate the fuel cell stack.

FIG. 2A is a perspective view in which a portion of a fuel cell stack 20 is shown in order to illustrate the fuel cell stack 20. In the fuel cell stack 20, a plurality of unit cells 10 are stacked in a row. In this case, the unit cells 10 are stacked so that the oxygen electrode 15 side of the unit cell 10 faces the interconnector 17 side of the adjacent unit cell 10.

Figure 2B:
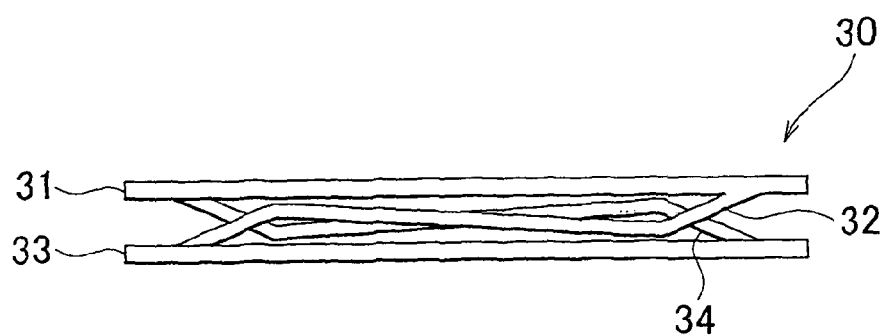
FIG. 2B is a plan view of a current collector shown in FIG. 2A.

Current collectors 30 are disposed between the unit cells 10. The current collectors 30 electrically connect adjacent unit cells 10 in series. FIG. 2B is a plan view showing an example of the current collector 30. The current collector 30 includes as a basic components: a first current collector piece 31 that contacts the oxygen electrode 15 of one of the two adjacent unit cells 10; a second current collector piece 32 that extends diagonally from the one of the unit cell 10 to the other one of the two adjacent unit cells 10; a third current collector piece 33 that contacts the interconnector 17 of the other one of the unit cell 10; and a fourth current collector piece 34 that extends diagonally from the other one of the unit cell 10 to the one of the unit cell 10. One of two opposite ends of the second current collector piece 32 is connected to the first current collector piece 31, and the other end of the second current collector piece 32 is connected to the third current collector piece 33. One of two opposite ends of the fourth current collector piece 34 is connected to the third current collector piece 33, and the other end of the fourth current collector piece 34 is connected to the first current collector piece 31. A plurality of such basic components are linked together in the axial direction of the unit cells 10 so as to form the current collector 30.

The second current collector piece 32 and the fourth current collector piece 34 each have bent portions (two bent portions in the first embodiment). Due to the bent portions, the second current collector piece 32 and the fourth current collector piece 34 performs a function as springs. Due to the spring structure, the current collectors 30 have a characteristic of closely attaching to the unit cells 10 and a characteristic of following deformation of the unit cells 10. Besides, due to spring structure, a space is formed between the first current collector piece 31 and the third current collector piece 33, the current collectors 30 have a ventilation characteristic.

Figures 3A, 3B:
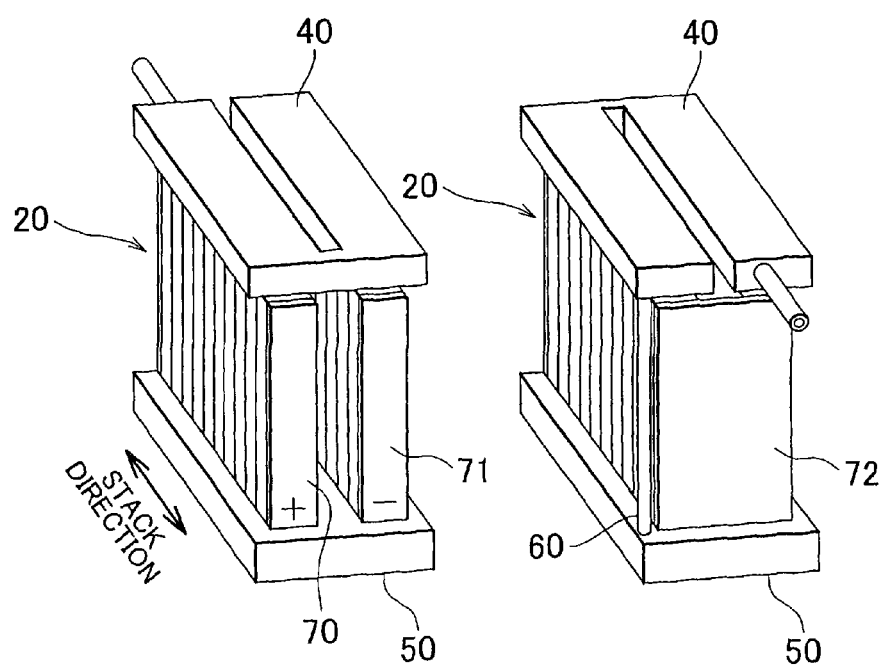
FIG. 3A is a perspective view for describing a reformer, a manifold to which fuel cell stacks are fixed, and terminals, which is viewed from a side.
FIG. 3B is a perspective view for describing the reformer, the manifold to which the fuel cell stacks are fixed, and the terminal, which is viewed from another side.

FIG. 3A and FIG. 3B are perspective views for describing a reformer 40, a manifold 50 to which fuel cell stacks 20 are fixed, and terminals. Two fuel cell stacks 20 are disposed on the manifold 50, and the reformer 40 is disposed over (above) the fuel cell stacks 20.

The two fuel cell stacks 20 are disposed side by side so that the stack direction of the unit cells 10 of the two fuel cell stacks 20 are substantially parallel to each other. Incidentally, the number of fuel cell stacks 20 fixed to the manifold 50 is not limited. The reformer 40 extends over (above) one of the two fuel cell stacks 20 in the stack direction of the unit cells 10, extends over the other fuel cell stack 20 in the stack direction of the unit cells 10, and the two extended ends are interconnected to form substantially a U-shape. As shown in FIG. 3B, an outlet opening of the reformer 40 and an inlet opening of the manifold 50 are interconnected by a fuel gas piping 60.

As shown in FIG. 3A, a first terminal 70 is disposed on a positive end portion of one of the two fuel cell stacks 20 in the stack direction of the unit cells 10. A second terminal 71 is disposed on a negative end portion of the other fuel cell stack 20 in the stack direction of the unit cells 10. As shown in FIG. 3B, the negative end portion of the one fuel cell stack 20 and the positive end portion of the other fuel cell stack 20 are electrically connected in series by a third terminal 72. When a load is electrically connected to the first terminal 70 and the second terminal 71, the load can be supplied with electric power that is generated by the fuel cell stacks 20.

Figure 4:
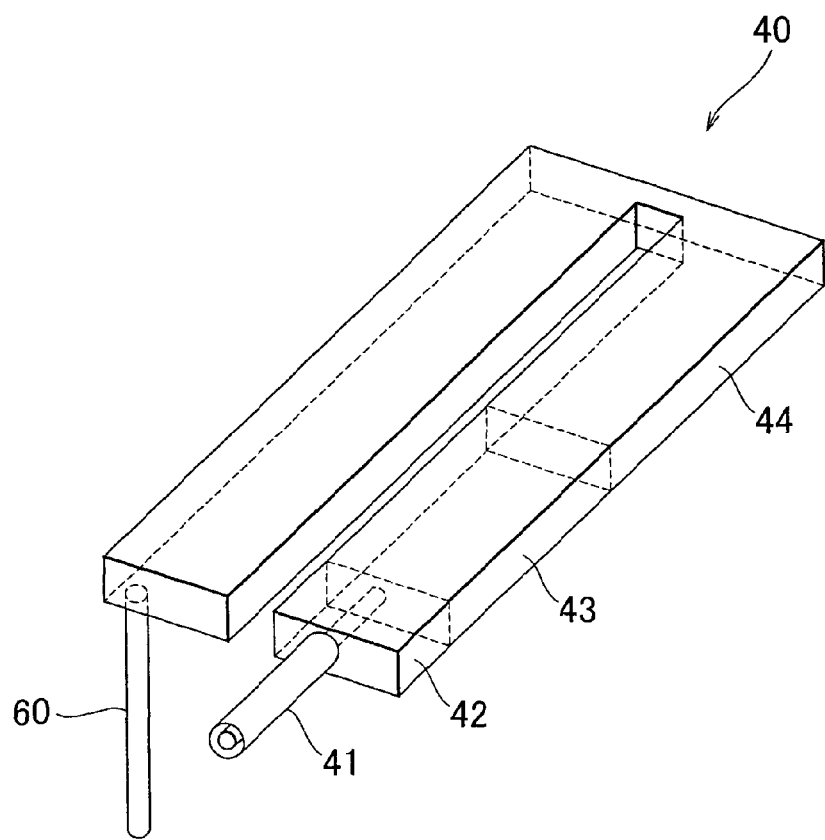
FIG. 4 is a perspective view for describing details of the reformer.

FIG. 4 is a perspective view for describing details of the reformer 40. The reformer 40 has a structure in which an input port member 41, an evaporation portion 42, a heating portion 43, and a reforming portion 44 are connected in that order from the inlet opening side. The input port member 41 is supplied with a hydrocarbon-base fuel and a reforming water. The hydrocarbon-base fuel for use herein may be, for example, a coal gas (town gas). In the first embodiment, the input port member 41 has a double-pipe structure. The reforming water is introduced to the inner pipe of the input port member 41, and the hydrocarbon-base fuel is introduced to the space between the inner pipe and the outer pipe.

The evaporation portion 42 is a space in which reforming water is evaporated by utilizing combustion heat of a fuel off-gas described below. In the first embodiment, the inner pipe of the input port member 41 extends to the evaporation portion 42. The reforming water introduced to the input port member 41 flows out from a distal end of the inner pipe of the input port member 41, and evaporates within the evaporation portion 42. After that, reforming water (vapor) flows into the heating portion 43. The hydrocarbon-base fuel introduced to the input port member 41 flows into the evaporation portion 42, and then flows into the heating portion 43.

The heating portion 43 is a space in which the reforming water and the hydrocarbon-base fuel are heated by combustion heat of the fuel off-gas. For example, ceramics balls are enclosed in the heating portion 43. The reforming portion 44 is a space in which the steam-reforming reaction of the reforming water and the hydrocarbon-base fuel takes place. For example, ceramics balls to which a reforming catalyst, such as Ni, Ru, Rh, Pt, etc., is applied are enclosed in the reforming portion 44.

Figure 5:
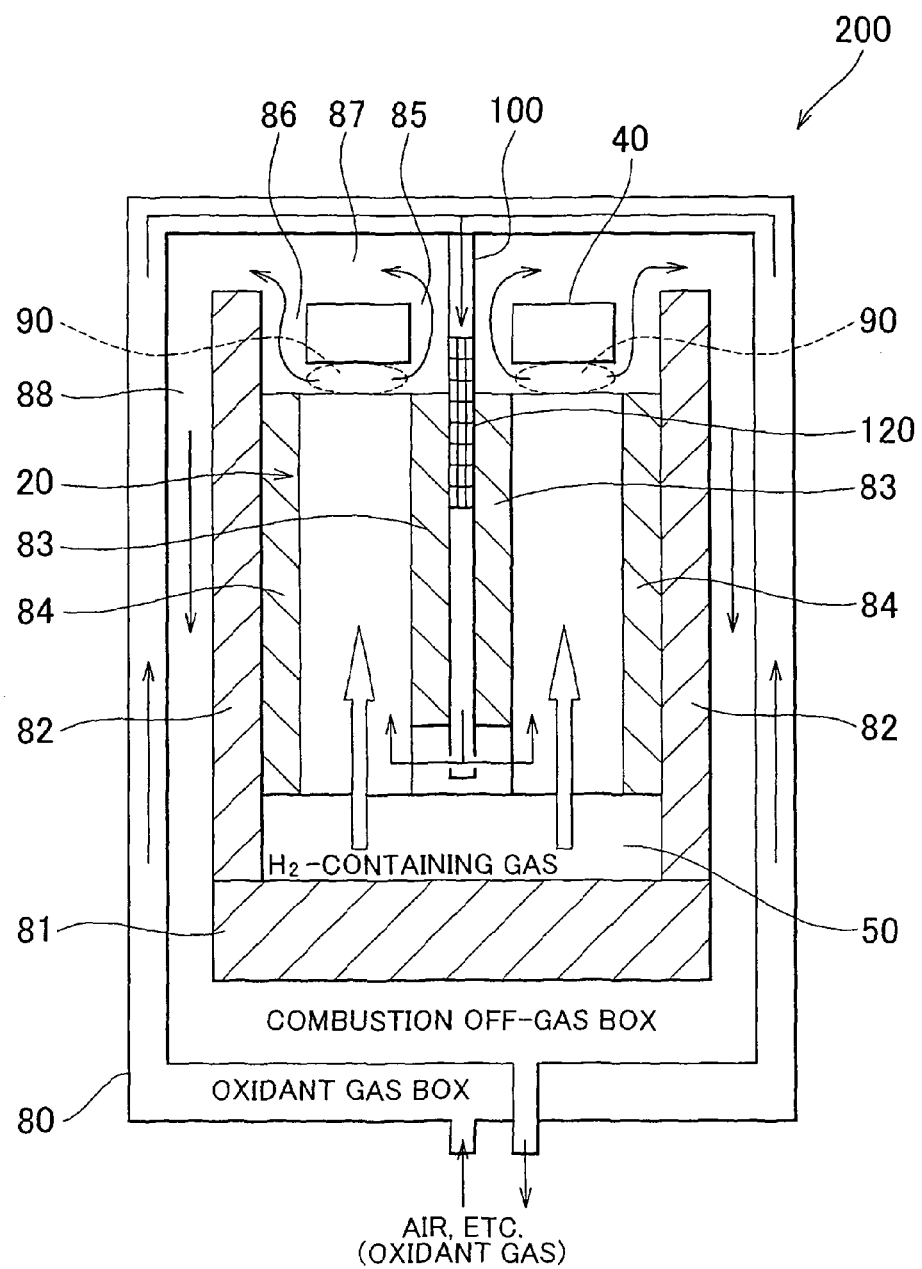
FIG. 5 is a sectional view for describing an overall construction of a fuel cell module in accordance with a first embodiment.

FIG. 5 is a sectional view for describing an overall construction of a fuel cell module 200 in accordance with the first embodiment. The fuel cell module 200 is disposed in a casing 80 having a double wall which forms a flow channel in which the oxidant gas flow. A lower thermal insulation member 81 disposed in a lower portion of the manifold 50, and side thermal insulation members 82 disposed in the stack direction of the unit cells 10 define a space in which the fuel cell stack 20, the reformer 40, the manifold 50, etc. shown in FIGS. 3A and 3B are housed. Incidentally, in the first embodiment, first internal thermal insulation members 83 are disposed between an oxidant gas distributing member 100 described below and the unit cells 10. Besides, second internal thermal insulation members 84 are disposed between the unit cells 10 and the side thermal insulation members 82. In the first embodiment, the unit cells 10 at the reformer 40 side is defined as upward, and the unit cells 10 at the manifold 50 side is defined as downward.

An oxidant gas inlet opening of the casing 80 is provided at a bottom surface of the casing 80. The oxidant gas enters an oxidant gas box, that is the bottom portion of the casing 80, and flows through side flow channels formed at the casing 80, and then flows above the fuel cell stacks 20. After that, the oxidant gas flows down into the oxidant gas distributing member 100 disposed between the two fuel cell stacks 20, and then is supplied to the fuel cell stacks 20 from their lower end. As described above with reference to FIGS. 3A and 3B, the fuel gas is supplied from the manifold 50 into the fuel gas passageways 12 of the unit cells 10. Thus, electricity is generated in each unit cell 10.

The fuel gas that has not been used for electricity generation (fuel off-gas) in the unit cells 10, and the oxidant gas that has not been used for electricity generation (oxidant off-gas) in the unit cells 10 merges at an upper end of the unit cells 10. Since the fuel off-gas contains combustibles, such as hydrogen and the like, that have not been used for electricity generation, the fuel off-gas can be burned by utilizing oxygen contained in the oxidant off-gas. In the first embodiment, the portions between the upper ends of the unit cells 10 and the reformer 40 are called combustion portions 90. The combustion heat generated at the combustion portions 90 is utilized for the reforming reaction in the reformer 40. Due to the combustion heat, the reforming reaction in the reformer 40 is accelerated.

After combusted in the combustion portions 90, the fuel off-gas and the oxidant off-gas (hereinafter, referred to as "combustion off-gas") flow into a combustion off-gas distributing channel. The combustion off-gas distributing channel includes first combustion off-gas distributing channels 85 formed between the oxidant gas distributing member 100 and the reformer 40, and second combustion off-gas distributing channels 86 formed between the side thermal insulation members 82 and the reformer 40. The combustion off-gas having passed through the first combustion off-gas distributing channels 85 is supplied to upper combustion off-gas channels 87 that are formed between an upper surface of an internal wall of the casing 80 and upper surfaces of the reformer 40. After that, the combustion off-gas flows down through side combustion off-gas channels 88 that are formed between the side thermal insulation members 82 and the casing 80. The combustion off-gas having passed through the second combustion off-gas distributing channels 86 flows into the side combustion off-gas channels 88, and flows downward therethrough. After flown through the side combustion off-gas channels 88, the combustion off-gas flows into an off-gas box that is formed between the lower thermal insulation member 81 and the oxidant gas box. After that, the off-gas is discharged from the fuel cell module 200.

Figure 6A:
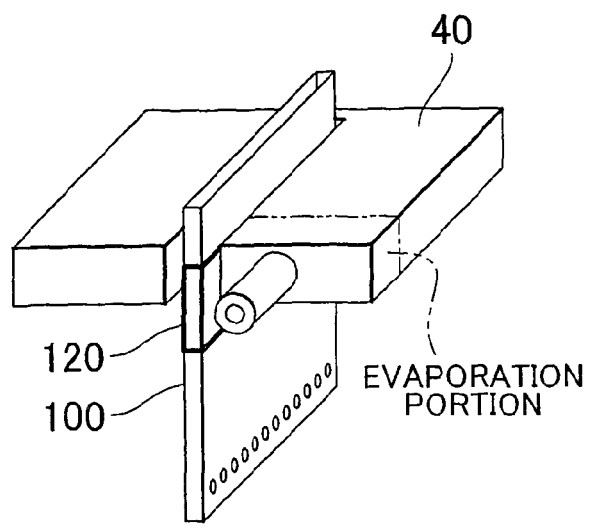
FIG. 6A is an extracted perspective view of an oxidant gas distributing member and the reformer.

FIG. 6A is an extracted perspective view of the oxidant gas distributing member 100 and the reformer 40. In first embodiment, the oxidant gas distributing member 100 is disposed in the casing 80 so as to be sandwiched between a portion of the reformer 40 that is above one of the two fuel cell stacks 20, and a portion of the reformer 40 that is above the other one of the two fuel cell stacks 20. An upper end portion of the oxidant gas distributing member 100 is protruded upward from the reformer 40, and is connected to a flow channel for supplying the oxidant gas to the upper portion of the casing 80. A lower end of the oxidant gas distributing member 100 extends to the vicinity of the unit cells 10.

Figure 6B:
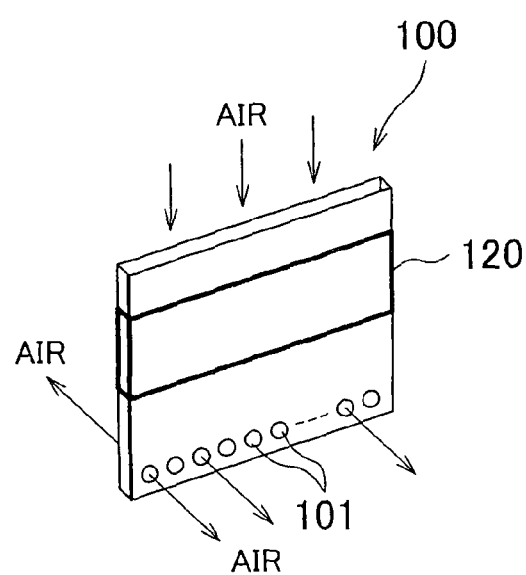
FIG. 6B is a perspective view of the oxidant gas distributing member.

FIG. 6B is a perspective view of the oxidant gas distributing member 100. The oxidant gas distributing member 100 has a flattened box shape and has a hollow space. The hollow space functions as a flow channel through which the oxidant gas flows. Hereinafter, the hollow space is called the oxidant gas distributing channel.

The upper end portion of the oxidant gas distributing member 100 has an opening portion through which the oxidant gas flows into the oxidant gas distributing member 100. In the first embodiment, the opening portion at the upper end portion of the oxidant gas distributing member 100 extends entirely over the upper end portion of the oxidant gas distributing member 100. The lower end portion of the oxidant gas distributing member 100 that faces the two fuel cell stack 20 side walls has a plurality of oxidant gas outlet openings 101 that are formed at predetermined intervals along the stack direction of the unit cells 10. The oxidant gas discharged from the oxidant gas outlet openings 101 is supplied to the lower end portion of each unit cell 10. Specifically, the oxidant gas channel of the oxidant gas distributing member 100 is a flow channel which supplies the oxidant gas along the reformer 40, the combustion portion 90, and an end (upper end) of the unit cells 10 to another end (lower end) of the unit cells 10 in that order, and the oxidant gas is then supplied to the lower end of each unit cell 10.

Figure 6C:
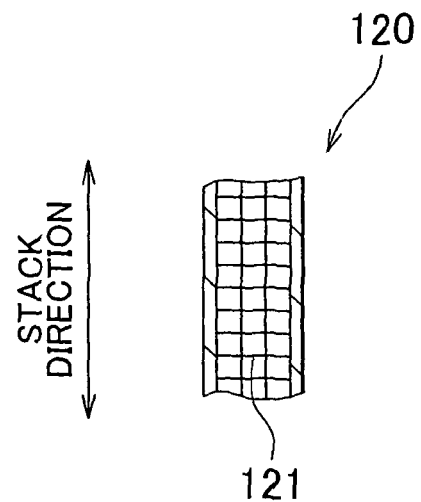
FIG. 6C is a sectional view of a thermal conductive portion having partition members which is viewed from an upper end of the oxidant gas distributing member.

The oxidant gas distributing member 100 includes a thermal conductive portion 120 that is provided at the one end (upper end) of the unit cells 10 and that has a higher thermal conductivity than the another end (lower end) of the unit cells 10. FIG. 6C is a sectional view of the thermal conductive portion 120 that is viewed from the upper end of the oxidant gas distributing member 100. The thermal conductive portion 120 has a partition member 121 that separates the flow path of an oxidant gas distributing channel into a plurality of sections. That is, the thermal conductive portion 120 has a so-called micro-channel structure. In this case, the thermal conductive portion 120 has a larger thermal conduction area than other portions of the oxidant gas distributing member 100. Due to this effect, the thermal conductive portion 120 has a higher thermal conductivity than the other portions of the oxidant gas distributing member 100. Incidentally, the partition member 121 rectifies the flow of the oxidant gas in the oxidant gas distributing-channel.

According to the fuel cell module 200 in accordance with this embodiment, the oxidant gas can be heated by the heat exchange between the combustion portions 90 and upper end of the unit cells 10, and the oxidant gas that flows in the oxidant gas distributing member 100. This makes it possible to supply the heated oxidant gas to the lower end of each unit cell 10, so that the temperature of the lower end of each unit cell 10 will increase. In consequence, it is possible to reduce the temperature difference within the unit cells 10 in the vertical direction. Besides, since the upper end of the oxidant gas distributing member 100 (the upper end of the unit cells 10) has a higher thermal conductivity than the lower end of the oxidant gas distributing member 100 (the lower end of the unit cells 10), that is, since the lower end of the oxidant gas distributing member 100 is lower in thermal conductivity than the upper end of the oxidant gas distributing member 100, it is possible at the lower end of the unit cells 10 to restrain the heat exchange between the unit cells 10 and the oxidant gas that flows in the oxidant gas distributing member 100. This makes it possible to restrain the temperature decline of the lower end of the unit cells 10, so that the temperature difference in the unit cells 10 in the vertical direction can be reduced.

Figure 6D:
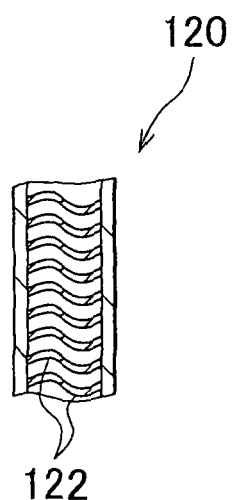
FIG. 6D is a sectional view of the thermal conductive portion having fins which is viewed from the upper end of the oxidant gas distributing member.

Incidentally, the thermal conductive portion 120 may also have a construction other than that formed by the partition member 121 as long as the oxidant gas distributing member 100 has a higher thermal conductivity than other portions of the oxidant gas distributing member 100. For example, as shown in FIG. 6D, the thermal conductive portion 120 may have fins 22 as an alternative. Alternatively, the thermal conductive portion 120 may have dimples. For example, the dimples may be formed on internal surfaces of the oxidant gas distributing member 100, that is, on the side walls at the fuel cell stack 20 side.

Besides, the partition member 121, the fins 122 or the dimples of the thermal conductive portion 120 may also be provided on external surfaces of the oxidant gas distributing member 100, that is, on the side walls at the fuel cell stack 20 side.

Figure 7:
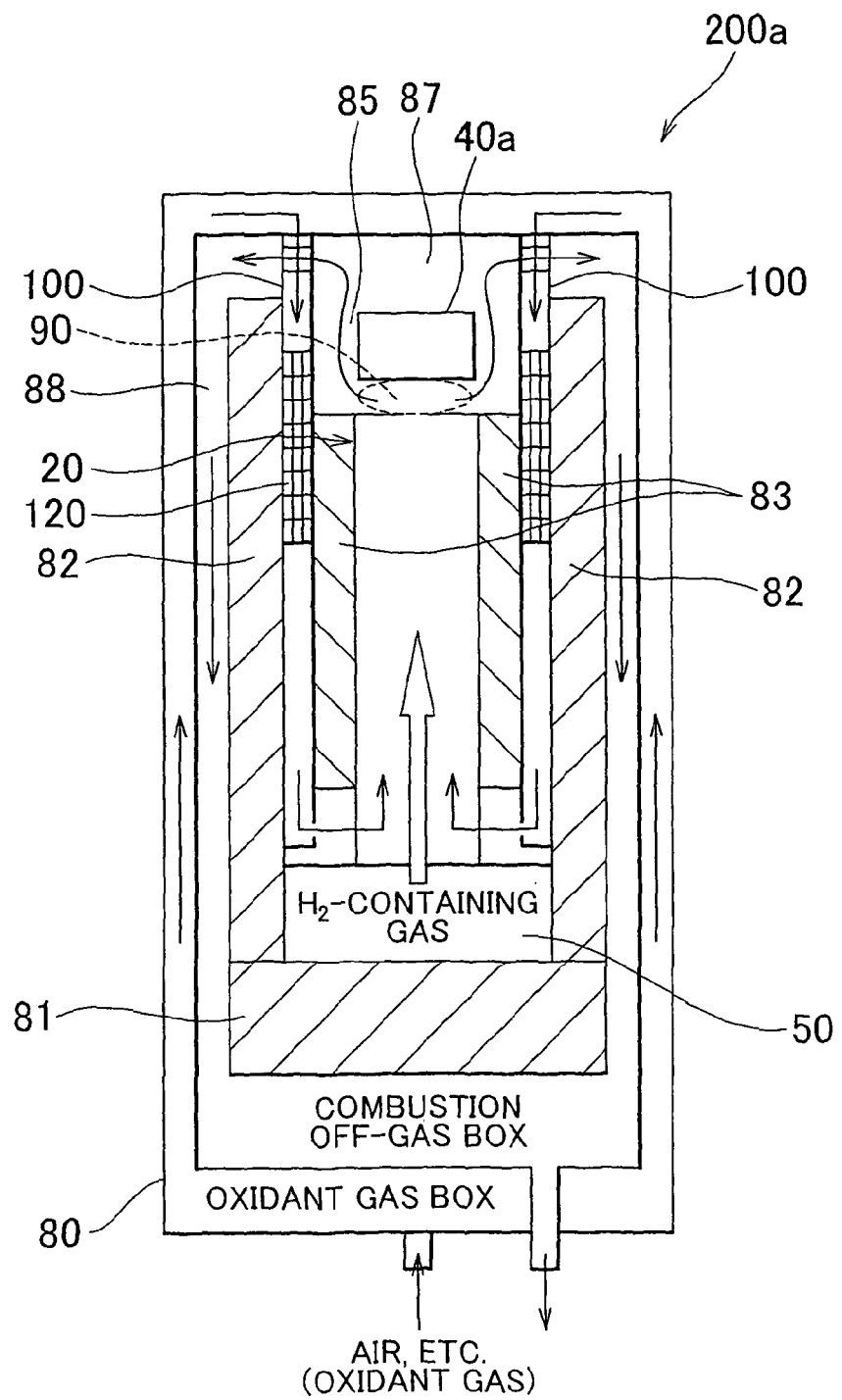
FIG. 7 is a sectional view for describing an overall construction of a fuel cell module in accordance with a second embodiment.

Next, a fuel cell module 200*a* in accordance with a second embodiment of the invention will be described. FIG. 7 is a sectional view for describing an overall construction of the fuel cell module 200*a*. The fuel cell module 200*a* is different from the fuel cell module 200 shown in FIG. 5 in that the fuel cell module 200*a* has only one fuel cell stack 20 instead of two fuel cell stacks 20, and in that the fuel cell module 200*a* has a reformer 40*a* instead of the reformer 40, and in that the fuel cell module 200*a* does not have the second internal thermal insulation members 84. The reformer 40*a* has a construction that corresponds to only one of two sections of the reformer 40 shown in FIG. 4 which are correspondingly located above the two fuel cell stacks 20.

In the fuel cell module 200*a* in accordance with the second embodiment, the oxidant gas can be heated by the heat exchange between the combustion portion 90 and upper end of the unit cells 10, and the oxidant gas that flows in the oxidant gas distributing member 100. This makes it possible to supply the heated oxidant gas to the lower end of each unit cell 10, so that the temperature of the lower end of each unit cell 10 will increase. In consequence, it is possible to reduce the temperature difference within the unit cells 10 in the vertical direction.

Incidentally, in the fuel cell module 200*a*, it suffices that one of the two oxidant gas distributing members 100 has a thermal conductive portion 120. However, the temperature difference within the unit cells 10 in the vertical direction can be further reduced if each of the two oxidant gas distributing members 100 has a thermal conductive portion 120.

Figure 8:
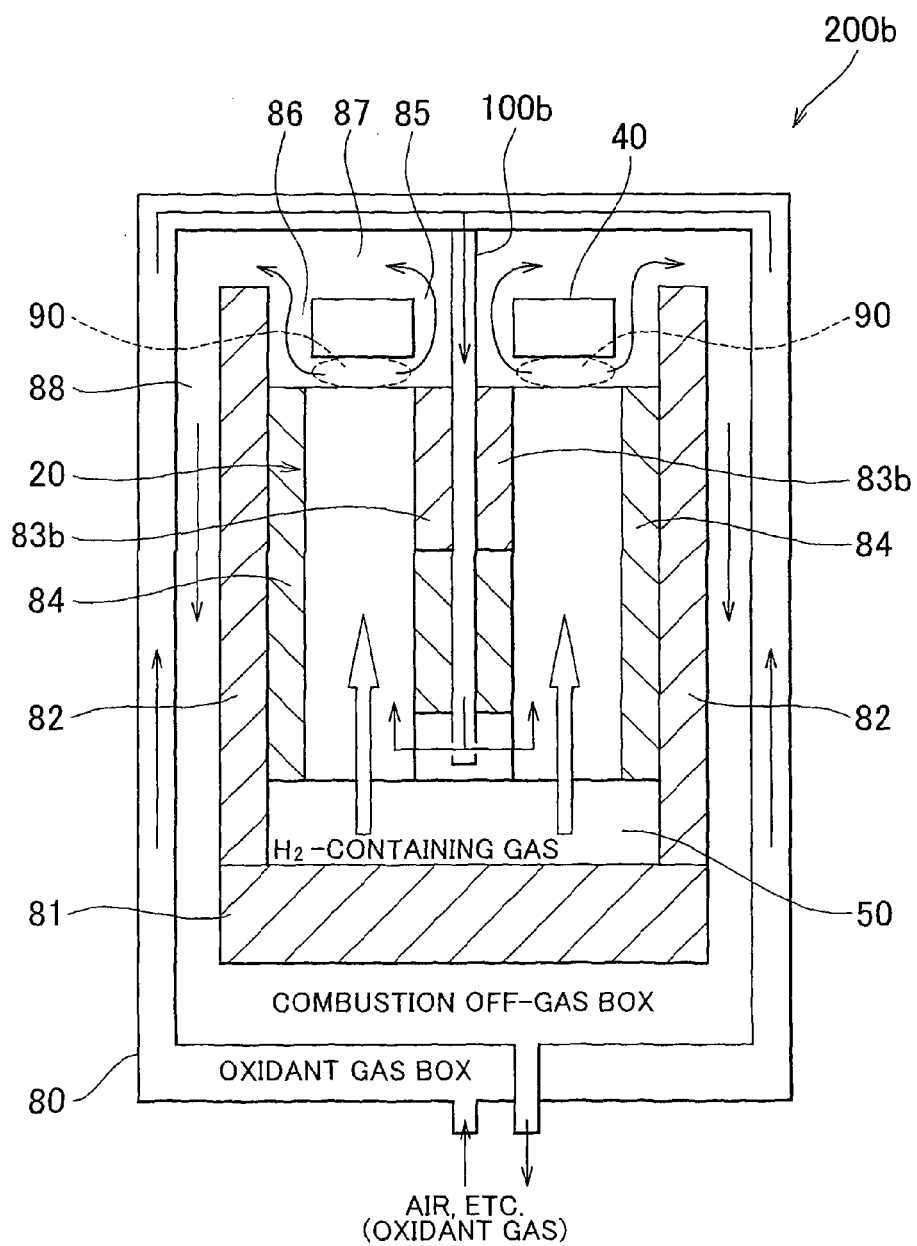
FIG. 8 is a sectional view for describing an overall construction of a fuel cell module in accordance with a third embodiment.

Next, a fuel cell module 200*b* in accordance with a third embodiment of the invention will be described. FIG. 8 is a sectional view for describing an overall construction of the fuel cell module 200*b*. The fuel cell module 200*b* is different from the fuel cell module 200 shown in FIG. 5 in that the fuel cell module 200*b* is provided with an oxidant gas distributing member 100*b* instead of the oxidant gas distributing member 100, and in that first internal thermal insulation members 83*b* are provided instead of the first internal thermal insulation members 83. The oxidant gas distributing member 100*b* is different from the oxidant gas distributing member 100 in that the oxidant gas distributing member 100*b* does not have a partition member 121.

As for the first internal thermal insulation members 83*b*, the thermal conductivity is higher at the lower end of the unit cells 10 than at the upper end thereof. In the third embodiment, the first internal thermal insulation members 83*b* are constructed so that the thermal conductivity increases stepwise (or gradually) from the lower end to the upper end of the unit cells 10. Concretely, each of the first internal thermal insulation members 83*b* is divided into two sections in the vertical direction. The thermal conductivity of the upper-side first internal thermal insulation members 83*b* is higher than that of the lower-side first internal thermal insulation members 83*b*. In this case, the heat exchange between the oxidant gas that flowing in the oxidant gas distributing member 100*b* and the unit cells 10 occurs more efficiently at the one end (upper end) of the unit cells 10 than at the another end (lower end) of the unit cells 10.

According to the fuel cell module 200*b* in accordance with this embodiment, heat of the upper end side of the unit cells 10 can be efficiently transferred to the oxidant gas distributing member 100*b* via the thermal conductive portions (upper-side portion) of the first internal thermal insulation members 83*b*. Besides, heat transferred to the oxidant gas distributing member 100*b* can be used to heat the oxidant gas that flows in the oxidant gas distributing member 100*b*. This will make it possible to reduce the temperature difference within the unit cells 10 in the vertical direction.

Besides, since the thermal conductivity is lower at the lower end of the unit cells 10 than at the upper end of the unit cells 10, heat exchange between the unit cells 10 and the oxidant gas that flows in the oxidant gas distributing member 100*b* can be restrained at the lower end of the unit cells 10. Due to this effect, temperature decline at the lower end of the unit cells 10 can be restrained, so that the temperature difference within the unit cells 10 in the vertical direction can be reduced.

Figure 9:
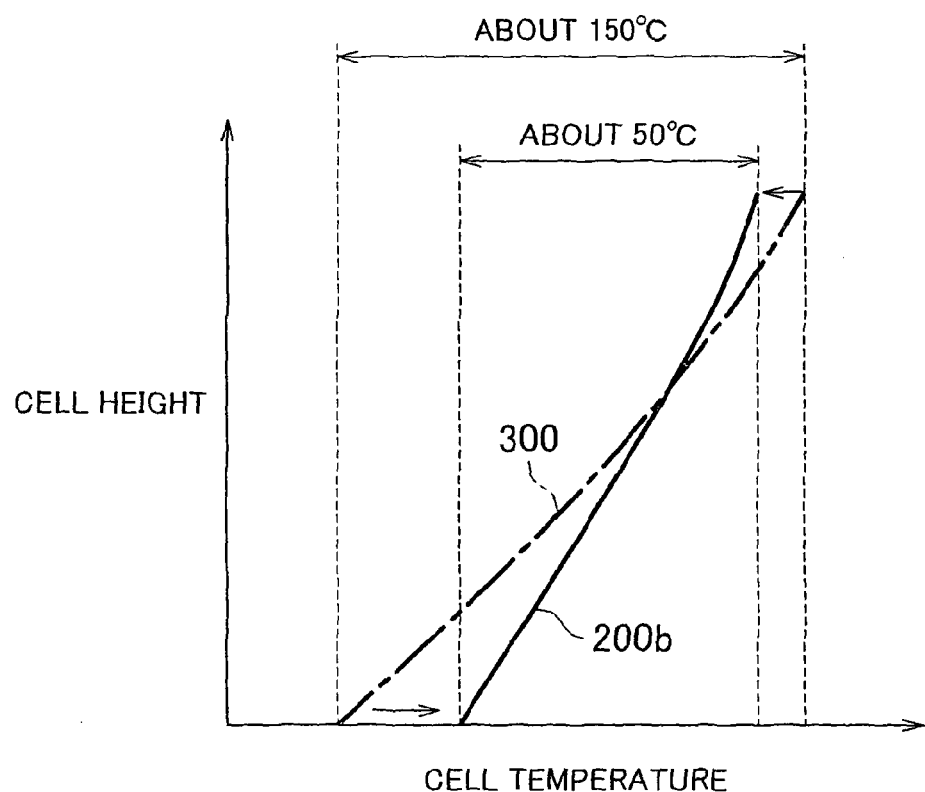
FIG. 9 is a graph for describing effects of the fuel cell module in accordance with the third embodiment.

FIG. 9 is a graph for describing effects of the fuel cell module 200*b*. A fuel cell module 300 in accordance with a comparative example has a first internal thermal insulation members that have a uniform thermal conductivity. In comparison between the fuel cell module 200*b* and the fuel cell module 300, the temperature at the lower end of the unit cells 10 is higher in the fuel cell module 200*b* than in the fuel cell module 300, and the temperature at the upper end thereof is lower in the fuel cell module 200*b*. In consequence, the temperature difference within the unit cells 10 in the vertical direction is reduced in the fuel cell module 200*b*.

Figure 10:
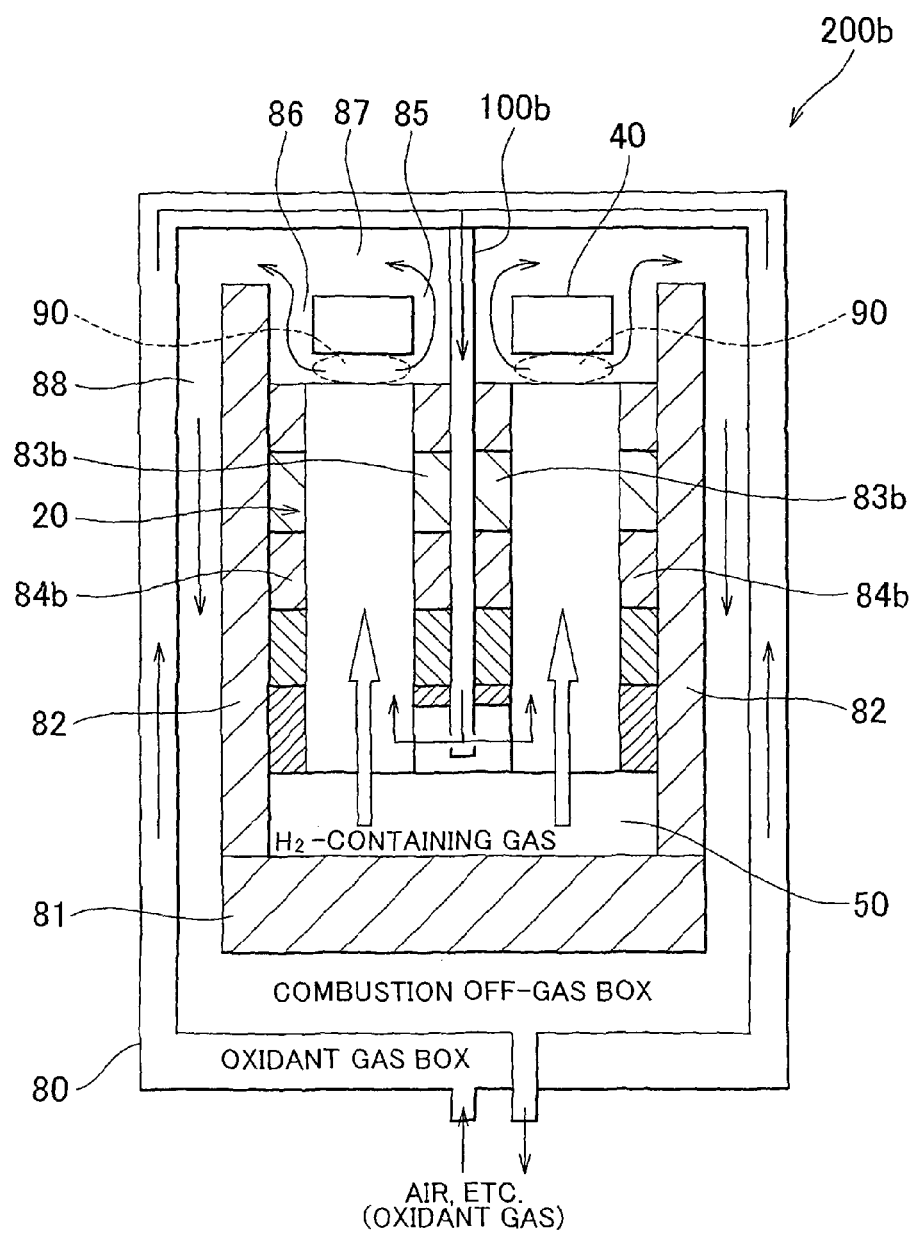
FIG. 10 is a sectional view for describing an overall construction of a fuel cell module in accordance with a first modification of the third embodiment.

The number of divisions of each first internal thermal insulation member 83*b* is not particularly limited. Besides, the second internal thermal insulation members 84 may have the same construction as the first internal thermal insulation members 83*b*. FIG. 10 is a sectional view for describing an overall construction of a fuel cell module 200*b* in accordance with a first modification of the third embodiment. The fuel cell module 200*b* in accordance with this modification is different from the fuel cell module 200*b* shown in FIG. 8 in that each first internal thermal insulation member 83*b* is divided into five sections so that the thermal conductivity thereof increases stepwise (gradually) from the lower end to the upper end of the fuel cell stacks 20, and in that second internal thermal insulation members 84*b* are provided instead of the second internal thermal insulation members 84. The second internal thermal insulation members 84*b*, similarly to the first internal thermal insulation members 83*b*, are each divided into five sections so that the thermal conductivity thereof increases stepwise (gradually) from the lower end to the upper end of the unit cells 10.

In the fuel cell module 200*b* in accordance with this modification, heat of the upper end of the unit cells 10 can be efficiently transferred to the oxidant gas distributing member 100*b* via thermal conductive portions (upper-side portions) of the first internal thermal insulation members 83*b*. This makes it possible to reduce the temperature difference within the unit cells 10 in the vertical direction.

Incidentally, in the fuel cell modules 200*b* in accordance with the third embodiment and the first modification of the third embodiment, the first internal thermal insulation members 83*b* and the second internal thermal insulation members 84*b* may have a construction in which the thermal conductivity thereof gradually increases from the lower end to the upper end of the unit cells 10.

In a second modification of the third embodiment, the side thermal insulation members 82 may also have a construction in which the thermal conductivity thereof increases stepwise or gradually from the lower end to the upper end of the unit cells 10. Due to this construction, heat of the upper end of the unit cells 10 can be released to the outside via thermal conductive portions (upper-side portions) of the side thermal insulation members 82. This makes it possible to reduce the temperature difference within the unit cells 10 in the vertical direction.

Incidentally, in the fuel cell modules 200b in accordance with the third embodiment and first and second modifications of the third embodiment, the oxidant gas distributing member 100 in accordance with the first embodiment may be provided instead of the oxidant gas distributing member 100b.

Figure 11:
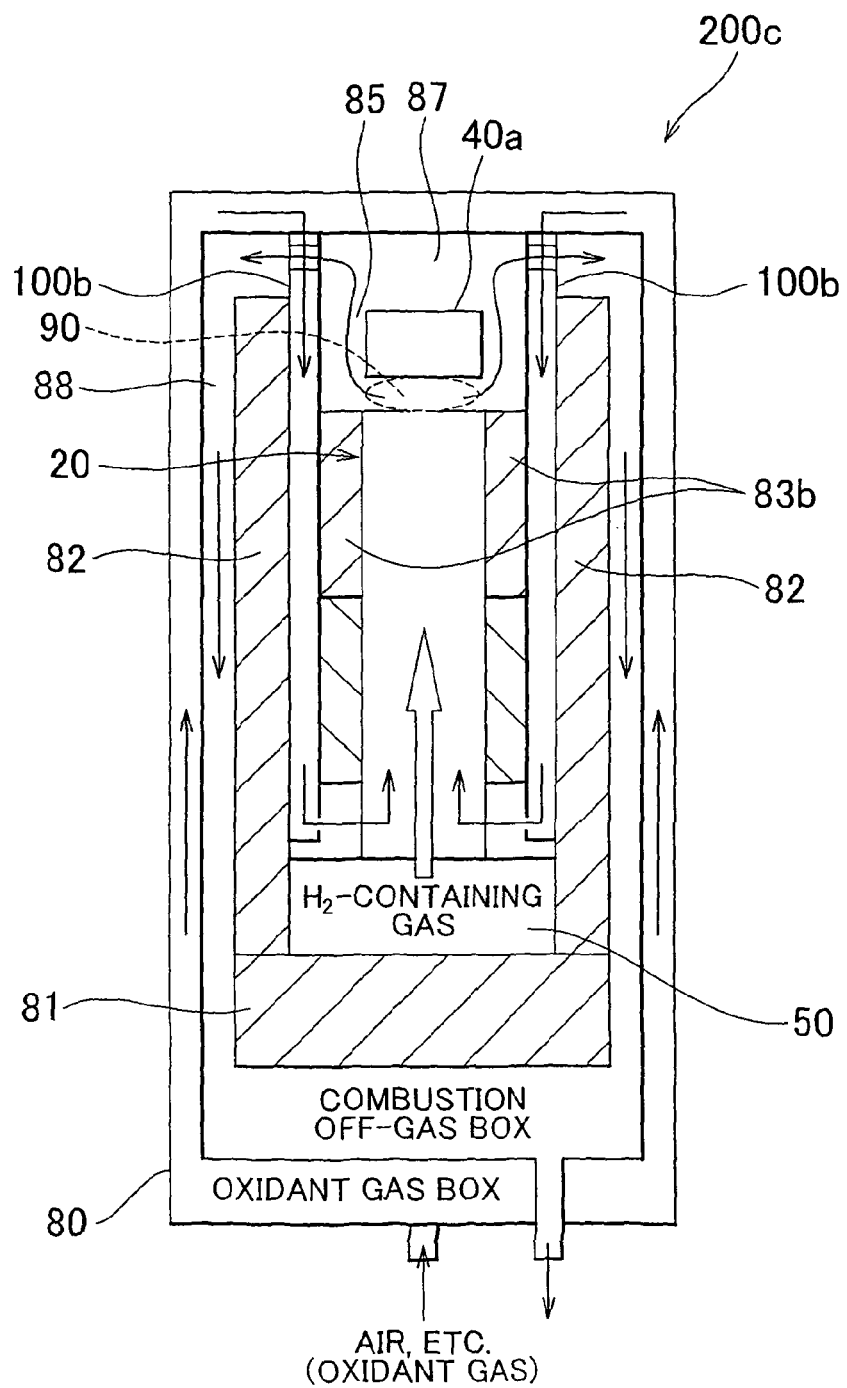
FIG. 11 is a sectional view for describing an overall construction of a fuel cell module in accordance with a fourth embodiment.

Next, a fuel cell module 200c in accordance with a fourth embodiment of the invention will be described. FIG. 11 is a sectional view for describing an overall construction of the fuel cell module 200c. The fuel cell module 200c is different from the fuel cell module 200a shown in FIG. 7 in that oxidant gas distributing members 100b are provided instead of the oxidant gas distributing members 100, and in that first internal thermal insulation members 83b are provided instead of the first internal thermal insulation members 83.

In the fuel cell module 200c in accordance with this embodiment, heat of an upper end of the unit cells 10 can be efficiently transferred to the oxidant gas distributing members 100b via thermal conductive portions (upper-side portions) of the first internal thermal insulation members 83b. Besides, heat transferred to the oxidant gas distributing member 100b can be used to heat the oxidant gas that flows in the oxidant gas distributing members 100b, while at the lower end of the unit cells 10, the heat exchange between the unit cells 10 and the oxidant gas that flows in the oxidant gas distributing members 100b can be restrained. Due to this effect, the temperature difference within the unit cells 10 in the vertical direction can be reduced.

Besides, the first internal thermal insulation members 83b may also have a construction in which the thermal conductivity thereof increases gradually from the lower end to the upper end of the unit cells 10. Besides, the side thermal insulation members 82 may also have a construction in which the thermal conductivity thereof increases stepwise or gradually from the lower end to the upper end of the unit cells 10. Besides, the fuel cell module 200c may be provided with oxidant gas distributing members 100 in accordance with the second embodiment instead of the oxidant gas distributing members 100b.

Figure 12:
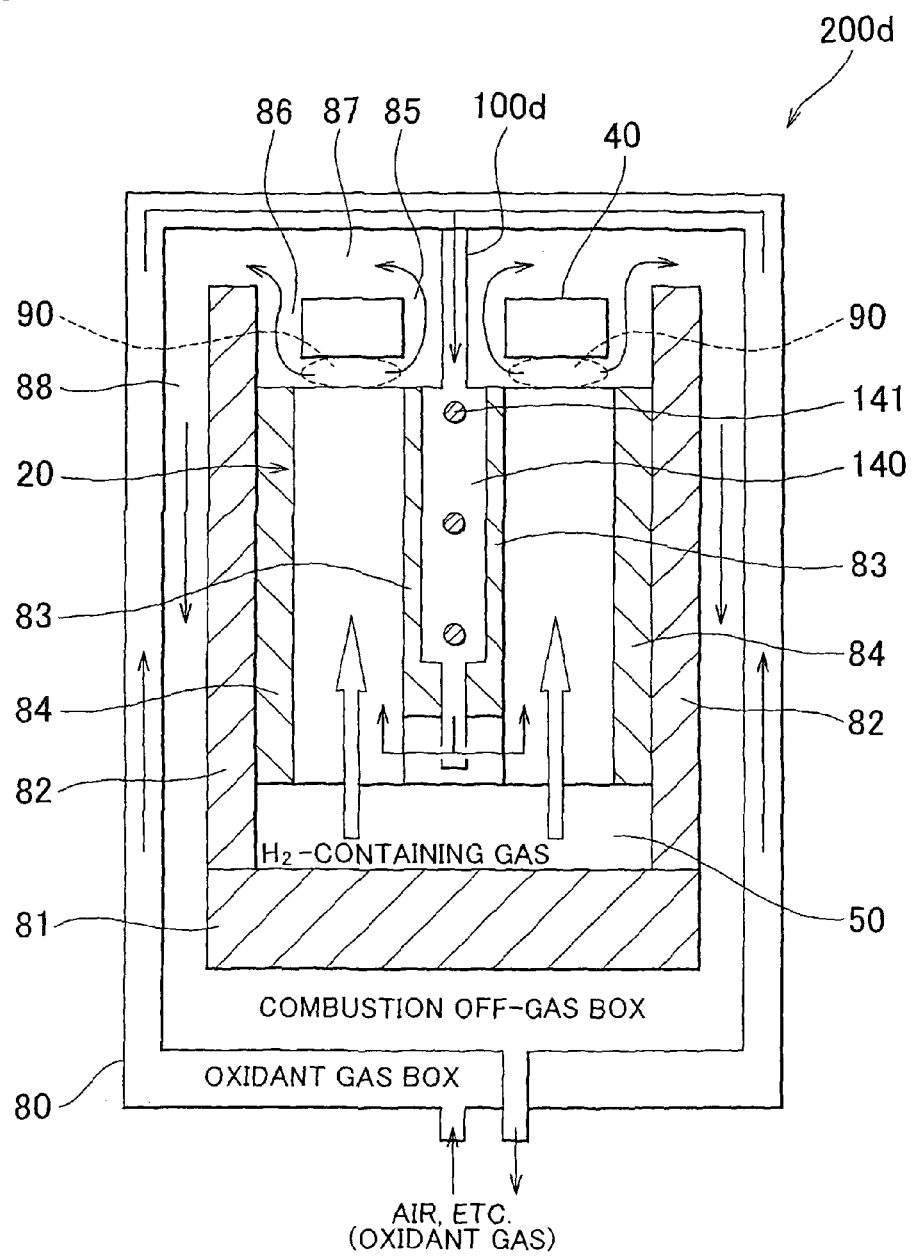
FIG. 12 is a sectional view for describing an overall construction of a fuel cell module in accordance with a fifth embodiment.

Subsequently, a fuel cell module 200d in accordance with a fifth embodiment of the invention will be described. FIG. 12 is a sectional view for describing an overall construction of the fuel cell module 200d. The fuel cell module 200d is different from the fuel cell module 200 shown in FIG. 5 in that an oxidant gas distributing member 100d is provided instead of the oxidant gas distributing member 100. The oxidant gas distributing member 100d is different from the oxidant gas distributing member 100 in that the oxidant gas distributing member 100d does not have a partition member 121, and in that the oxidant gas distributing channel has a protruded portion 140 that is protruded toward side surfaces of fuel cell stacks 20 which extend in the stack direction of the unit cells 10.

Figure 13A:
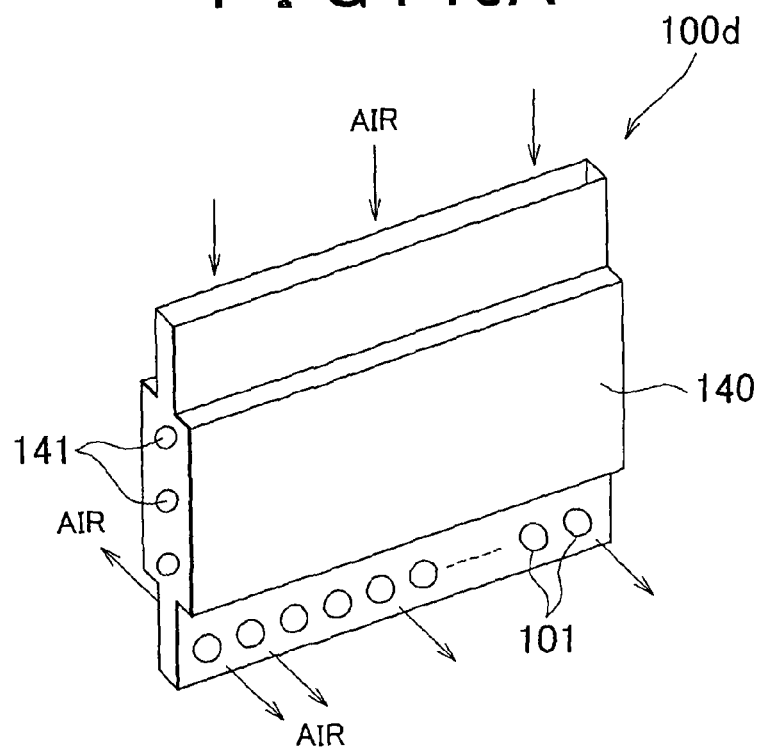
FIG. 13A is a perspective view of an oxidant gas distributing member in accordance with the fifth embodiment.
Figure 13B:
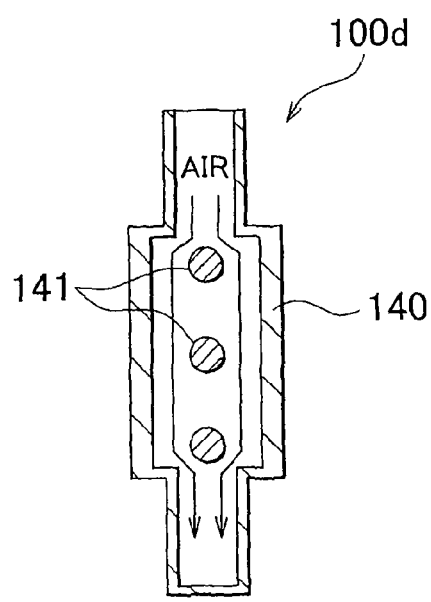
FIG. 13B is a sectional view of the oxidant gas distributing member viewed in the stack direction of the fuel cell stack.

FIG. 13A is a perspective view of the oxidant gas distributing member 100d. The protruded portion 140 is provided with rectifying members 141. FIG. 13B is a sectional view of the oxidant gas distributing member 100d viewed in the stack direction of the unit cells 10. The rectifying members 141 brings the flow of the oxidant gas in the oxidant gas distributing channel closer to the side walls of the protruded portion 140 at the fuel cell stack 20 side (hereinafter, termed the wall surfaces in the protruded portion 140). As long as this function is secured, the rectifying members 141 are not particularly limited. In this embodiment, the rectifying members 141 are bar members whose axial direction coincides with the stack direction of the unit cell 10. In this construction, the oxidant gas upstream of the bar members will flow close to the wall surfaces in the protruded portion 140 after striking the bar members. Incidentally, the material of the bar members is not particularly limited; for example, it may be a porous material.

According to the fuel cell module 200d in accordance with this embodiment, since the protruded portion 140 is provided, it is possible to accelerate the heat exchange between the unit cells 10 and the oxidant gas that flows in the oxidant gas distributing member 100d. Due to this effect, since the heated oxidant gas can be supplied to the lower end of each unit cell 10, the temperature difference within the unit cells 10 in the vertical direction can be reduced. Incidentally, the protruded portion 140 may be provided so that the protruded portion 140 is not located at the lower end of the unit cells 10 (is located above a lower end portion of the unit cells 10). For example, the protruded portion 140 may be located above the oxidant gas outlet openings 101. In this construction, the heat exchange between the unit cells 10 and the oxidant gas that flows in the oxidant gas distributing member 100d (the protruded portion 140) can be restrained at the lower-end side of the unit cells 10. Due to this effect, the temperature difference within the unit cells 10 in the vertical direction can be reduced.

Besides, according to the fuel cell module 200d, since the rectifying members 141 are provided, the flow of the oxidant gas in the protruded portion 140 can be brought closer to the fuel cell stacks 20. Due to this effect, the heating of the oxidant gas can be accelerated.

Incidentally, as shown in FIG. 13B, the thickness of the walls of the protruded portion 140 at the fuel cell stack 20 sides is greater than the thickness of the oxidant gas distributing member 100d at the fuel cell stack 20 side other than the protruded portion 140. Due to this effect, it is possible to accelerate the transfer of heat in the portions of the protruded portion 140, which has greater thickness, in the stack direction of the unit cells 10. In consequence, in the oxidant gas flowing in the protruded portion 140, the temperature difference within the stack direction of the unit cells 10 can be reduced. Due to this effect, the temperature difference within the fuel cell stacks 20 in the stack direction of the unit cells 10 can be reduced.

Incidentally, the first internal thermal insulation members 83 and the side thermal insulation members 82 of the fuel cell module 200d in accordance with this embodiment may also be constructed as in the third embodiment.

Figure 14:
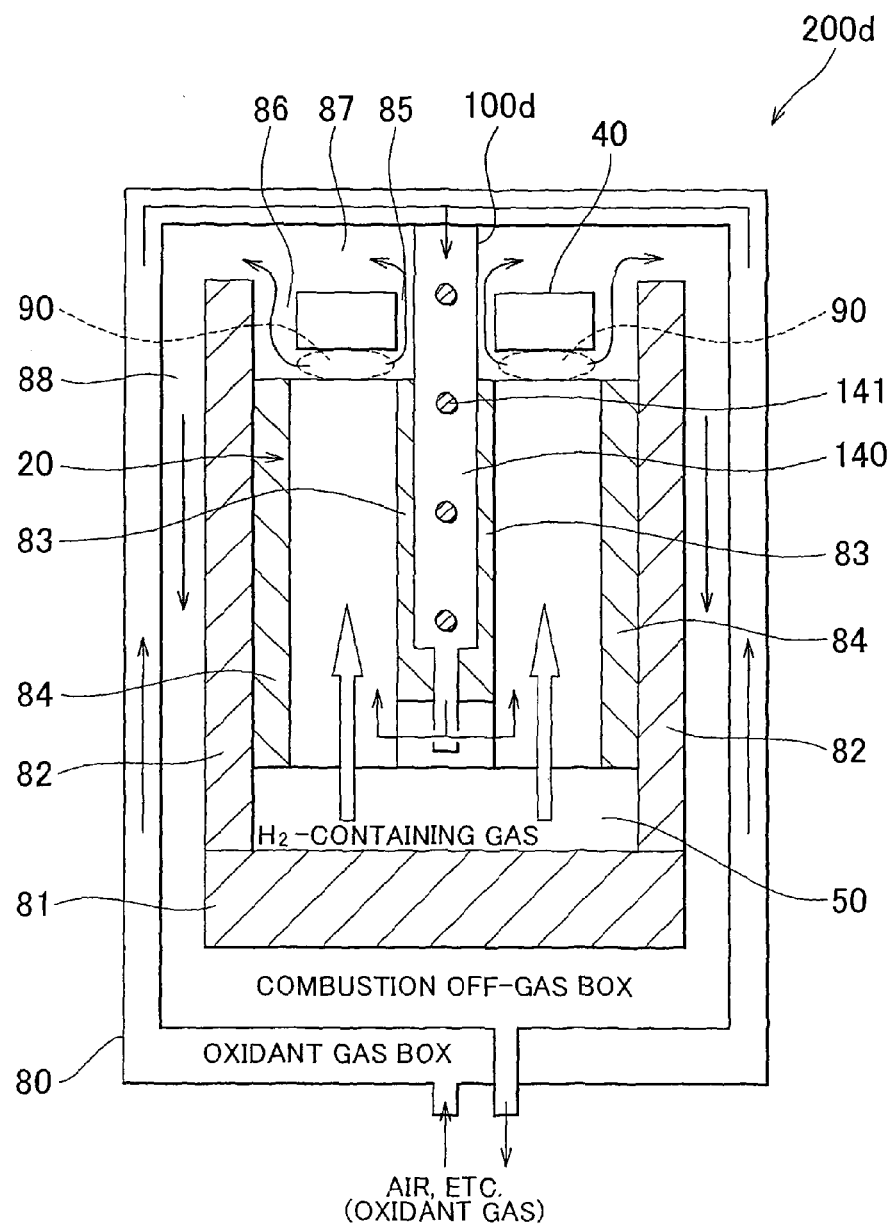
FIG. 14 is a sectional view for describing an overall construction of a fuel cell module in accordance with a first modification of the fifth embodiment.

FIG. 14 is a sectional view for describing an overall construction of a fuel cell module 200d in accordance with a first modification of the fifth embodiment. The fuel cell module 200d in accordance with this embodiment is different from the fuel cell module 200d shown in FIG. 12 in that the protruded portion 140 of the oxidant gas distributing member 100d extends to an upper end of the oxidant gas distributing member 100d.

According to the fuel cell module 200d in accordance with this modification, in a portion of the protruded portion 140 that extends near combustion portions 90 and a portion of the protruded portion 140 that extends near the first combustion off-gas distributing channels 85, it is possible to accelerate the heat exchange between the combustion portions 90 and the oxidant gas that flows in the oxidant gas distributing member 100*d*. Due to this effect, the oxidant gas that flows in the oxidant gas distributing member 100*d* can be further heated. In consequence, the oxidant gas having a further increased temperature can be supplied to the lower end of each unit cell 10, so that the temperature difference within the unit cells 10 in the vertical direction can be further reduced.

Figure 15:
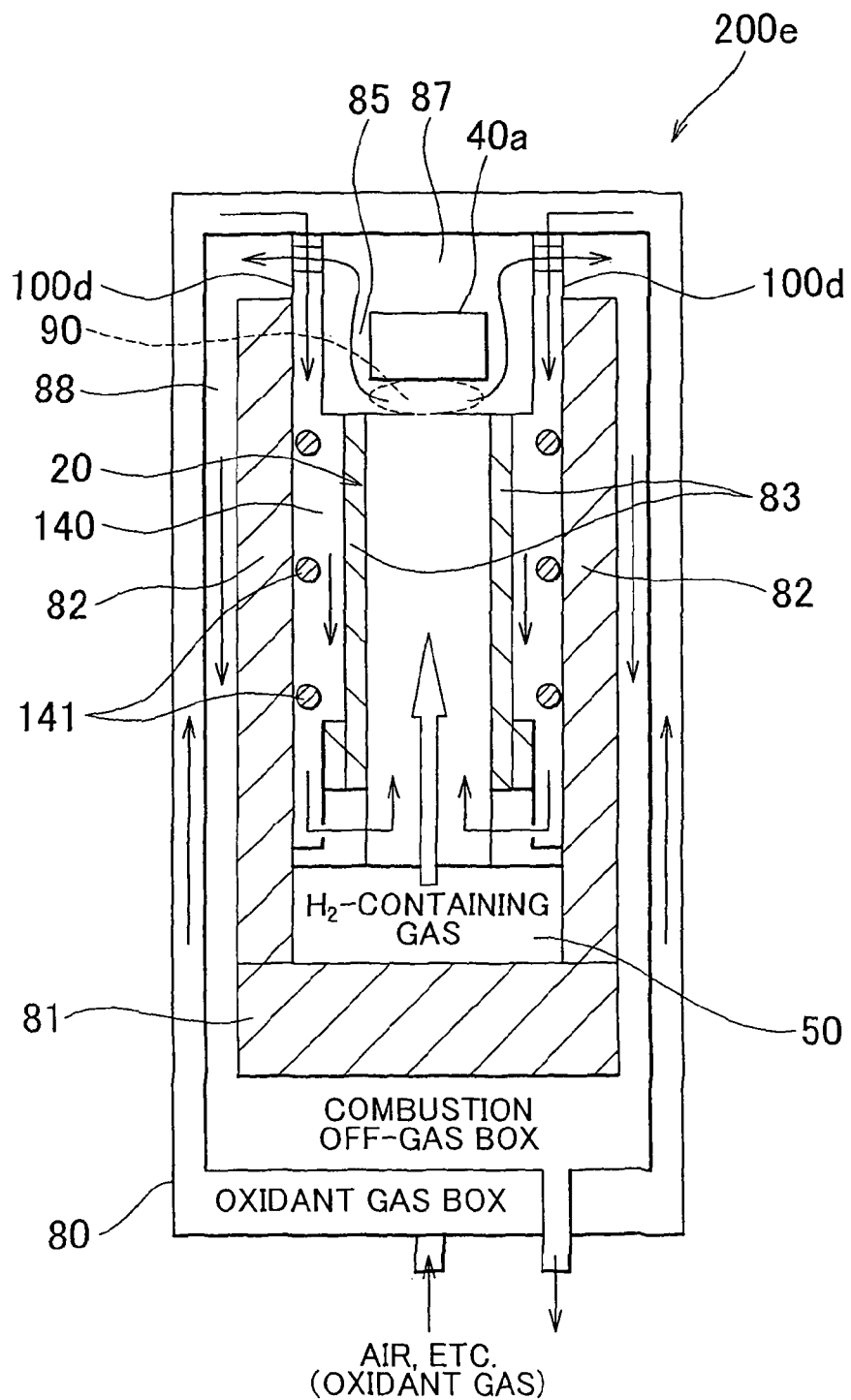
FIG. 15 is a sectional view for describing an overall construction of a fuel cell module in accordance with a sixth embodiment.

Subsequently, a fuel cell module 200*e* in accordance with a sixth embodiment of the invention will be described. FIG. 15 is a sectional view for describing an overall construction of the fuel cell module 200*e*. The fuel cell module 200*e* is different from the fuel cell module 200*a* shown in FIG. 7 in that oxidant gas distributing members 100*d* are provided instead of the oxidant gas distributing members 100. Incidentally, in the sixth embodiment, the oxidant gas distributing members 100*d* each have a protruded portion 140 that is protruded toward an adjacent side surface of a fuel cell stack 20.

In the fuel cell module 200*e* in accordance with the sixth embodiment, since the protruded portions 140 are provided, it is possible to accelerate the heat exchange between the fuel cell stack 20 and the oxidant gas that flows in the oxidant gas distributing members 100*d*. Due to this effect, the heated oxidant gas can be supplied to the lower end of each unit cell 10, so that the temperature difference within the unit cells 10 in the vertical direction can be reduced.

Incidentally, the protruded portion 140 of each oxidant gas distributing member 100*d* may extend to the upper end thereof as in the construction shown in FIG. 14. Besides, it is also permissible that only one of the two oxidant gas distributing members 100*d* have a protruded portion 140. However, if each of the oxidant gas distributing members 100*d* has a protruded portion 140, the temperature difference within the unit cells 10 in the vertical direction can be more reduced.

Besides, the first internal thermal insulation members 83 and the side thermal insulation members 82 of the fuel cell module 200*e* in accordance with the sixth embodiment may be constructed as in the fourth embodiment.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell module comprising:
a fuel cell stack that is formed by stacking a plurality of unit cells that generate electricity using an oxidant gas and a fuel gas;
an oxidant gas distributing member that is disposed on a side of a side surface which extends along a stack direction of the unit cells in the fuel cell stack, and that distributes the oxidant gas for use for electricity generation of the unit cells from one end side toward the other end side of each of the unit cells and then supplies the oxidant gas to the other end side of each of the unit cells;
a reformer that is disposed on the one end side of each of the unit cells; and
a combustion portion that is disposed between the one end side of each of the unit cells and the reformer, and that burns a fuel off-gas that is left unused in the electricity generation of the unit cells, using an oxidant off-gas that is left unused in the electricity generation of the unit cells,
the fuel cell stack, the oxidant gas distributing member, the reformer, and the combustion portion being arranged in a casing,
wherein the oxidant gas distributing member has at least one of a structure in which the oxidant gas distributing member has a fin on an external surface or an internal surface of a side wall at a portion corresponding to the one end side of each of the unit cells and does not have the fin on either the external surface or the internal surface of the side wall at a portion corresponding to the other end side of each of the unit cells, a structure in which the oxidant gas distributing member has a partition member that partitions a channel into a plurality of paths at the portion corresponding to the one end side of each of the unit cells and does not have the partition member in the path at the portion corresponding to the other end side of each of the unit cells, and a structure in which the oxidant gas distributing member has a dimple on the external surface or the internal surface of the side wall at the portion corresponding to the one end side of each of the unit cells and does not have the dimple on either the external surface or the internal surface of the side wall at the portion corresponding to the other end side of each of the unit cells, thereby having a higher thermal conductivity at the portion corresponding to the one end side of each of the unit cells than at the portion corresponding to the other end side of each of the unit cells.

2. A fuel cell module comprising:
a fuel cell stack that is formed by stacking a plurality of unit cells that generate electricity using an oxidant gas and a fuel gas;
a reformer that is disposed on one end side of each of the unit cells;
a combustion portion that is disposed between the one end side of each of the unit cells and the reformer, and that burns a fuel off-gas that is left unused in the electricity generation of the unit cells, using an oxidant off-gas that is left unused in the electricity generation of the unit cells; and
an oxidant gas distributing member that is disposed on a side of a side surface which extends along a stack direction of the unit cells in the fuel cell stack, that distributes the oxidant gas for use for electricity generation of the unit cells through the reformer, the combustion portion, and from the one end side to the other end side of each of the unit cells in this order and then supplies the oxidant gas to the other end side of the unit cells,
the fuel cell stack, the reformer, the combustion portion and the oxidant gas distributing member being arranged in a casing, wherein
in the oxidant gas distributing member, a portion corresponding to the one end side of each of the unit cells protrudes toward the side surface of the fuel cell stack, with respect to a portion corresponding to the other end side of each of the unit cells.

3. A fuel cell module comprising:
a fuel cell stack that is formed by stacking a plurality of unit cells that generate electricity using an oxidant gas and a fuel gas;
an oxidant gas distributing member that is disposed on a side of a side surface which extends along a stack direction of the unit cells in the fuel cell stack, and that distributes the oxidant gas for use for electricity generation of the unit cells from one end side toward the other end side of each of the unit cells and then supplies the oxidant gas to the other end side of each of the unit cells;

a reformer that is disposed on the one end side of each of the unit cells;

a combustion portion that is disposed between the one end side of each of the unit cells and the reformer, and that burns a fuel off-gas that is left unused in the electricity generation of the unit cells, using an oxidant off-gas that is left unused in the electricity generation of the unit cells; and internal thermal insulation members that are disposed on sides of respective surfaces which extend along a stack direction of the unit cells in the fuel cell stack, the fuel cell stack, the oxidant gas distributing member, the reformer, the combustion portion, and the internal thermal insulation members being arranged in a casing, wherein among the internal thermal insulation members that are disposed on the sides of the respective surfaces, the internal thermal insulation member that is disposed on the oxidant gas distributing member side is divided into a plurality of internal thermal insulation members from the other end side to the one end side of each of the unit cells, and among the plurality of the internal thermal insulation members obtained through division the internal thermal insulation member, which is located at a position corresponding to the one end side of each of the unit cells has a higher thermal conductivity than the internal thermal insulation member, which is located at a position corresponding to the other end side of each of the unit cells.

4. The fuel cell module according to claim 3, wherein the internal thermal insulation member that is disposed on the oxidant gas distributing member side is divided into a plurality of internal thermal insulation members such that thermal conductivity increases stepwise from the other end side to the one end side of each of the unit cells.

* * * * *